Jan. 20, 1942.   W. L. KAUFFMAN, 2D   2,270,450
WRINGER
Filed March 8, 1938   2 Sheets-Sheet 1
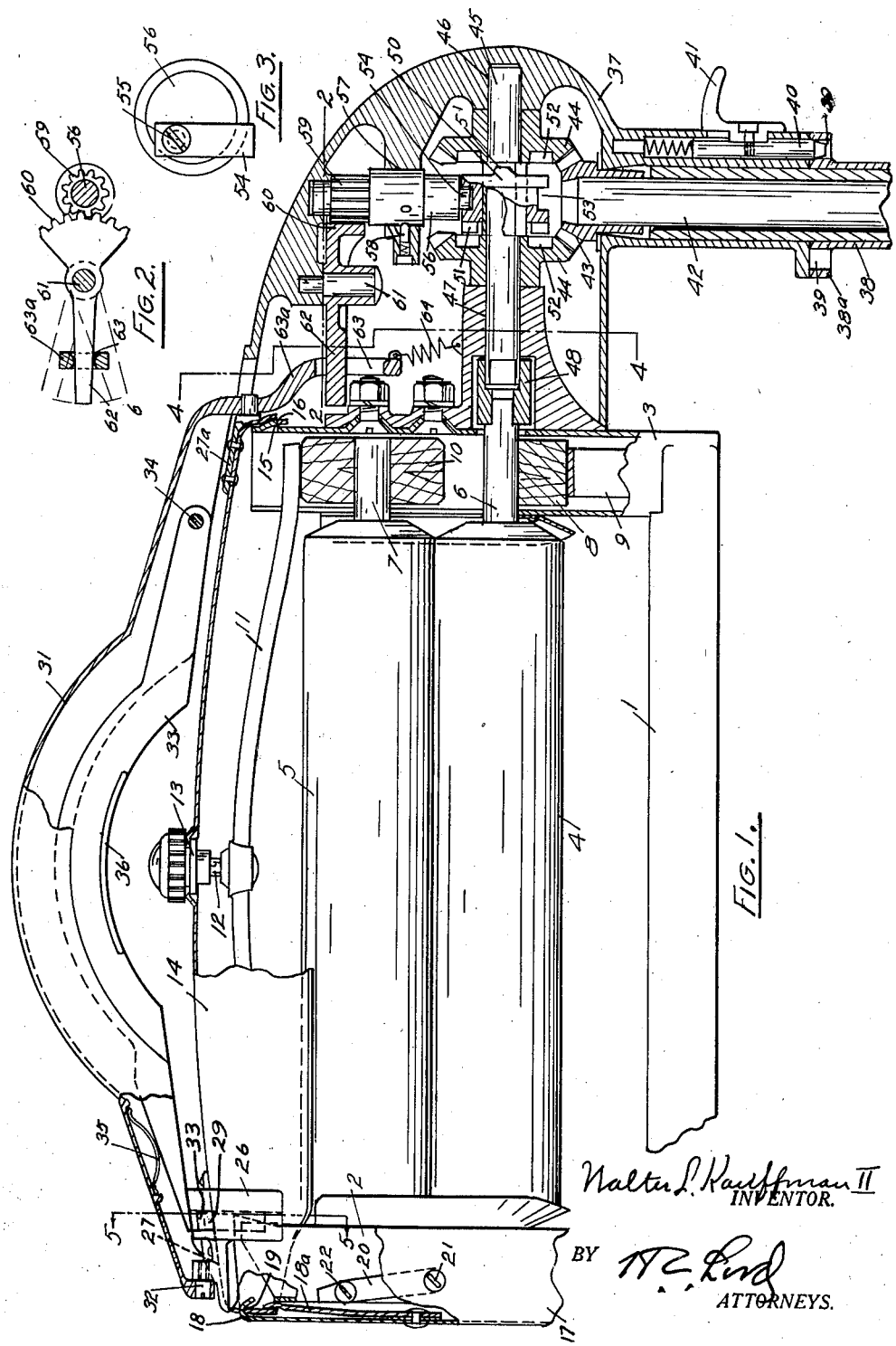

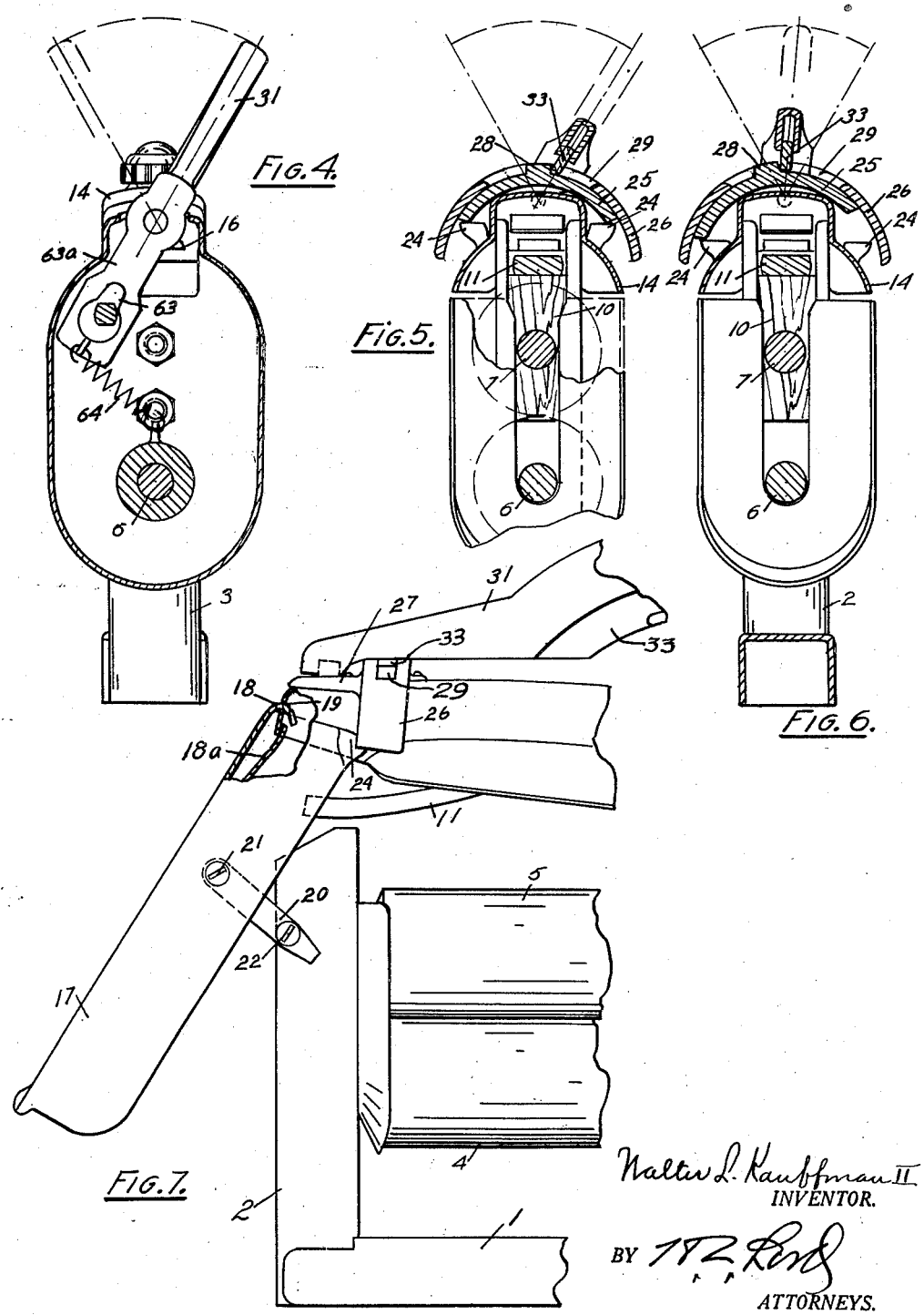

Patented Jan. 20, 1942

2,270,450

UNITED STATES PATENT OFFICE 2,270,450

WRINGER

Walter L. Kauffman II, Erie, Pa., assignor to Lovell Manufacturing Company, Erie, Pa., a corporation of Pennsylvania Application March 8, 1938, Serial No. 194,560

7 Claims. (Cl. 68—253)

Power wringers have been provided with power driving mechanisms usually including a controlling scheme involving a reversal of the drive with a neutral setting permitting the continuation of the primary driving mechanism without driving the wringer. This driving mechanism has been utilized not only in controlling the ordinary or normal operations of the wringer but as a safety device stopping the rolls or reversing them in case of accident. Power wringers have also been provided with safety devices designed to release the pressure on the rolls so that a continued drawing in of anything caught in the rolls may be obviated by the release of the pressure. Wringers have also been provided with pressure release devices which involved resetting mechanisms for resetting the pressure after release.

In the present invention the safety mechanism involves an actuator normally operable with relation to both the driving mechanism and the pressure release device but which is provided with a selector which, when operated, throws out one of the safety features, as exemplified, the release device. With this mechanism, therefore, it is possible, using the same actuator for controlling the gears, to render it inoperable for the pressure release device so that the driving mechanism may be thrown to neutral or to reverse without, at the same time, actuating the pressure device. Features and details of the invention will appear from the specification and claims.

A preferred embodiment of the invention is illustrated in the accompanying drawings as follows:

Fig. 1 shows a front elevation of a wringer partly in section included in the invention in its construction.

Fig. 2 a section on the line 2—2 in Fig. 1.

Fig. 3 a plan view of the clutch throwing crank.

Fig. 4 a section on the line 4—4 in Fig. 1.

Fig. 5 a section on the line 5—5 in Fig. 1 showing the actuator in position to move the driving mechanism to driving position but with the pressure release in set position.

Fig. 6 a similar view with the actuator in neutral as to both the release device and the driving mechanism.

Fig. 7 a front elevation of the wringer with the release device in release position.

1 marks the base of the wringer frame, 2 a stile opposite the driving mechanism, 3 a stile at the end of the wringer adjacent the driving mechanism, 4 a lower wringer roll, 5 an upper wringer roll, 6 a shaft of the lower wringer roll, and 7 a shaft of the upper wringer roll. Bearings 8 are provided for the shaft 6. These are arranged in the stiles 2 and 3 and are seated on brackets 9 arranged in the stiles. Bearings 10 for the upper shaft 7 are slidingly mounted in the stiles. A spring 11 rests on the bearings and is adjusted by a screw 12 operating in a nut 13, the nut 13 being fixed in a releasable top bar 14. The stile 3 has a shoulder 15 struck up in its outer face near the upper end, and the top bar which is of channel form with closed ends has a shoulder 16 formed in its ends engaging the shoulder 15. At the release end of the wringer a resetting lever 17 has a hook 18 in its upper end extending through a slot 19 in the end of the top bar. This hook forms a hinge for the lever 17, the lever 17 being preferably of channel form extending around the side stile. A spring 18a is secured to the lever and engages the inside of the end of the top bar (see Fig. 7), holding the hinge in engagement. Links 20 are pivotally mounted at the sides of the stile. These links are pivotally secured at 21 to the lever 17, and at 22 to the side stile, the links with the lever forming a toggle which, with the lever in its position against the stile, brings the pivots of the toggle including the hinge 18 and pivots 22 and 21 slightly out of line so as to tend to hold the lever 17 in its set position against the stile. The upper end of the lever 17 is provided with arms 24 extending inwardly along each side of the top bar. An arch shaped trip plate 25 has its ends, when in neutral position, resting on the arms 24. This trip plate is slidingly mounted under a cover plate 26 which is secured on a bracket 27, the bracket being secured to the top bar. The trip plate 25 has a projection 28 which extends through a slot 29 in the cover plate 26. An actuator 31 in the form of a top bar extending over the top of the wringer is pivotally mounted at the ends of the wringer by means of trunnion pins 32 on the bracket 27 and a similar bracket 27a at the opposite end of the top bar.

When the actuator 31 is rocked it moves the trip plate 25 and this in turn operating on one of the arms 24 moves the resetting lever so as to bring the pivots of the toggle links outwardly out of alignment and the lever is then free to swing up as shown in Fig. 7 permitting an upward movement of the top bar which, in turn, ordinarily releases the shoulders 15 and 16 thus releasing the pressure on the rolls and permitting them to separate.

A selector plate 33 is arranged under the bar 31, the bar being preferably of channel form and the plate is pivoted on the actuating bar at 34. The free end of the selector plate is adapted to engage the projection 28 in which case the swinging action of the actuator will effect a release. If, however, the selector plate is lifted the actuating bar may be swung forward or back without moving the trip plate and will assume the position shown in Fig. 5 so that with a return movement of the actuator the shoulder will be engaged and the trip plate will be actuated and a release effected unless the selector is lifted. In other words, it is in position to operate to effect a safety movement. A spring 35 is provided for yieldingly exerting downward pressure on the selector plate. The selector is preferably provided with a flattened portion 36 so that it gives more gripping surface for the operator. It will be noted that the selector plate and the actuator may be gripped at the same engaging position of the operator.

A gear head 37 is pivotally mounted on a post 38. The post has an index flange 38a with the index perforations 39. A bolt 40 is slidingly secured in the head and adapted to enter the perforations for locking the head and consequently the wringer in different positions. The bolt is provided with a handle 41 by means of which the bolt may be readily actuated.

A drive shaft 42 extends upwardly through the post and has a bevel gear 43 fixed on its upper end. The bevel gear meshes with reversing gears 44. The reversing gears are journaled on a shaft 45. The shaft is carried in bearings 46 and 47 in the head and is connected by universal joint 48 with the lower roll shaft 6. A clutch block 50 is arranged between the gears 44 and is splined in the usual manner on the shaft 45. It has jaws 51 adapted to engage detents 52 in the gear faces. It is provided with an annular groove 53 in which a bar 54 is slidingly mounted. The bar is pivotally secured on a crank-pin 55. The crank pin is at the lower end of a shaft 56. The shaft 56 is journaled in a bearing 57 in the head and is provided with a yielding indexing pin 58 which yieldingly holds the shaft in adjusted position. A gear 59 is fixed on the upper end of the shaft 56. A rack 60 meshes with the gear 59. The rack is journaled on a pin 61 secured in the head. The rear end of the rack has a projecting finger 62 which extends through a slot 63 in a finger 63a extending from the end of the actuator 31. A spring 64 operates on the lower end of the finger 63a and yieldingly tends to return the actuator bar 31 to a neutral position.

When the actuator is swung the finger 63a is swung with it. This rotates the rack 60 and consequently the gear 59, and this swings the crank 55 so as to move the clutch block into engagement with one or the other of the gears, depending on the direction of movement, or to a neutral position between the gears when the actuator is at central position.

With this device, therefore, it is possible to control and change the gear setting without disturbing the release mechanism. This is accomplished as above described by lifting the selecting bar. On the other hand, with the wringer in position and the selector in position as shown in Fig. 5, if the actuator is pushed forward, not only is a release of the pressure effected, but at the same time the driving mechanism is disengaged, and if the actuator is moved to an extreme position the gears are reversed. Thus, should an operator be caught, not only is the pressure released but the forward movement of the drive is stopped and may be reversed so as to assist the withdrawal of the hand even with relation to the weight of the roll. In order to reset the wringer all that is necessary is to bring the resetting lever back to its set position. This replaces the pressure. This resetting lever acting through the arms 24 moves the plate 25 to its neutral or central position. The selector plate is then raised and the actuator moved for the direction of drive desired. When released the selector is in position to engage the shoulder 28 to effect release as well as control the drive.

What I claim as new is:

1. In a wringer the combination of a frame; rolls mounted in the frame; a pressure means for the rolls; a driving mechanism for the rolls at one end of the wringer frame; a safety mechanism for the wringer comprising a pressure release device and a control device for the driving mechanism, the pressure release device being at the opposite end of the wringer frame from the driving mechanism; an actuator extending between said devices and operatively connected therewith; and a selector mechanism carried by and operable with the actuator at the will of the operator permitting actuation of both devices or rendering the actuator inoperative as to one of said devices.

2. In a wringer the combination of a frame; rolls mounted in the frame; a pressure means for the rolls; a driving mechanism for the rolls at one end of the wringer frame; a safety mechanism for the wringer comprising a pressure release device and a control device for the driving mechanism, the pressure release device being at the opposite end of the wringer frame from the driving mechanism; an actuator in the form of a bar over the top of the wringer mounted on the frame and adapted to operate on both the devices; and a selector mechanism mounted on the bar, said selector permitting, at the will of the operator, the actuation of both devices or rendering the actuator inoperative as to one of said devices.

3. A clothes wringer having in combination a frame, a pair of rolls mounted in said frame, pressure applying means carried by said frame normally effective to produce wringing pressure between said rolls and including release mechanism which may be operated to render said pressure applying means ineffective, driving means for said rolls including a clutch, a manually operable actuator member extending longitudinally of and pivotally mounted on said frame on an axis substantially parallel to said rolls, said actuator member having at one end a first operative connection with said clutch whereby pivotal movement of said actuator member in at least one direction disengages said clutch to render said driving means ineffective, said actuator member having at its other end a second operative connection with said release mechanism whereby pivotal movement of said actuator member in said one direction normally operates said release mechanism, said second connection including a latch member carried by said actuator member and which may be manually operated to render said second connection ineffective.

4. A wringer having a frame, rolls mounted in the frame, pressure means for the rolls, and a reversing driving mechanism for the rolls; the combination with the pressure means and driving mechanism of a safety mechanism for the wringer comprising a pressure release device and a device for controlling the drive mechanism, said devices having a central neutral position permitting a pressure setting for the pressure device and a disconnected relation of the driving mechanism, an actuator for actuating said devices mounted on the frame, and a selector mechanism carried by and operable with the actuator at the will of the operator permitting the actuation of both devices or rendering the actuator inoperative as to the release device.

5. A wringer having a frame, rolls mounted in the frame, pressure means for the rolls, and a reversing driving mechanism for the rolls; the combination with the pressure means and driving mechanism of a safety mechanism for the wringer comprising a pressure release device and a device for controlling the drive mechanism having an intermediate neutral position, an actuator for actuating said devices mounted on the frame, the actuator compelling a break in the driving connection with an operation of the release device, and a selector mechanism carried by and operable with the actuator at the will of the operator permitting the actuation of both devices or rendering the actuator inoperative as to the release device.

6. A wringer having a frame, rolls mounted in the frame, pressure means for the rolls, a reversing driving mechanism for the rolls, and a resetting mechanism for resetting pressure on the rolls; the combination with the pressure means and driving mechanism of a safety mechanism for the wringer comprising a release device effecting a release of the pressure means through a release of the resetting mechanism and a device for controlling the drive mechanism, said devices having a central neutral position permitting a pressure setting for the pressure device and a disconnected relation of the driving mechanism, an actuator for actuating said devices mounted on the frame, and a selector mechanism carried by and operable with the actuator at the will of the operator permitting the actuation of both devices or rendering the actuator inoperative as to the release device.

7. A wringer having a frame, rolls mounted in the frame, pressure means for the rolls, a reversing driving mechanism for the rolls, and a resetting mechanism for resetting pressure on the rolls; the combination with the pressure means and driving mechanism of a safety mechanism for the wringer comprising a pressure release device effecting a release through a release of the resetting mechanism and a device for controlling the drive mechanism, said devices having a central neutral position permitting a pressure setting for the pressure device and a disconnected relation of the driving mechanism, said resetting mechanism returning the release device to neutral position as the resetting device is actuated for resetting the pressure, an actuator for actuating said devices mounted on the frame, and a selector mechanism carried by and operable with the actuator at the will of the operator permitting the actuation of both devices or rendering the actuator inoperative as to the release device.

WALTER L. KAUFFMAN II.